United States Patent
Choi et al.

(10) Patent No.: US 8,279,475 B2
(45) Date of Patent: Oct. 2, 2012

(54) PRINTING APPARATUS AND METHOD FOR PROCESSING REAL-TIME COMMAND USING THE PRINTING APPARATUS

(75) Inventors: Hae Yong Choi, Seongnam (KR); Young Kyoo Cho, Suwon (KR)

(73) Assignee: Bixolon Co., Ltd., Suwon (KR)

(*) Notice: Subject to any disclaimer, the term of this patent is extended or adjusted under 35 U.S.C. 154(b) by 673 days.

(21) Appl. No.: 12/467,403

(22) Filed: May 18, 2009

(65) Prior Publication Data

US 2009/0296141 A1    Dec. 3, 2009

(30) Foreign Application Priority Data

May 27, 2008 (KR) .......... 10-2008-0049025
Aug. 12, 2008 (KR) .......... 10-2008-0079067

(51) Int. Cl.
*G06F 15/00* (2006.01)
*G05G 15/02* (2006.01)
(52) U.S. Cl. .......................... 358/1.15; 700/9
(58) Field of Classification Search .................. 358/1.15
See application file for complete search history.

(56) References Cited

U.S. PATENT DOCUMENTS

| | | | |
|---|---|---|---|
| 4,989,163 A | 1/1991 | Kawamata et al. | |
| 5,594,653 A | 1/1997 | Akiyama et al. | |
| 5,911,527 A * | 6/1999 | Aruga et al. | 400/149 |
| 6,198,985 B1 | 3/2001 | Miyasaka et al. | |
| 6,341,907 B1 | 1/2002 | Katsuyoshi | |
| 6,452,693 B1 | 9/2002 | Isoda et al. | |
| 6,768,557 B1 | 7/2004 | Minowa et al. | |
| 6,788,428 B1 | 9/2004 | Shimokawa | |
| 7,271,924 B1 | 9/2007 | Takamizawa et al. | |
| 2003/0161002 A1 | 8/2003 | Nishiwaki et al. | |

FOREIGN PATENT DOCUMENTS

| | | |
|---|---|---|
| EP | 0652533 A2 | 5/1995 |
| EP | 0902371 A1 | 3/1999 |
| EP | 1026599 A2 | 8/2000 |
| JP | 02292623 A | 12/1990 |
| JP | 9006555 A | 1/1997 |
| JP | 2000298564 A | 10/2000 |
| JP | 2004005758 A | 1/2004 |
| KR | 200076610 A1 | 12/2000 |

* cited by examiner

*Primary Examiner* — Saeid Ebrahimi Dehkordy
(74) *Attorney, Agent, or Firm* — The Webb Law Firm

(57) ABSTRACT

There are provided a printing apparatus and a method for processing real-time commands using the same. The printing apparatus is able to be stably operated without any mechanical troubles such as degraded performance of the printing apparatus, which are caused when real-time commands are analyzed and processed on a receive interrupt routine, by detecting real-time commands from data transmitted from the host computer, separately storing the detected real-time commands in a real-time command buffer and processing the stored real-time commands in preference to the other data.

22 Claims, 4 Drawing Sheets

PRINTING APPARATUS AND METHOD FOR PROCESSING REAL-TIME COMMAND USING THE PRINTING APPARATUS

CROSS-REFERENCE TO RELATED APPLICATIONS

This application claims the priorities of Korean Patent Application No. 2008-49025 filed on May 27, 2008 and Korean Patent Application No. 2008-79067 filed on Aug. 12, 2008, in the Korean Intellectual Property Office, the disclosures of which are incorporated herein by reference.

BACKGROUND OF THE INVENTION

1. Field of the Invention

The present invention relates to a printing apparatus that is operated according to real-time commands transmitted from a host computer and a method for processing real-time commands using the same, and more particularly, to a printing apparatus capable of being stably operated without any mechanical troubles such as degraded performance of the printing apparatus, which are caused when real-time commands are analyzed and processed on a receive interrupt routine, by detecting real-time commands from data transmitted from the host computer, separately storing the detected real-time commands in a real-time command buffer and processing the stored real-time commands in preference to the other data, and a method for processing real-time commands using the same.

2. Description of the Related Art

In general, printing apparatuses, which are coupled to a personal computer to print documents or photographs, or which are provided in data processing apparatuses (i.e. POS terminals and cash registers used for monetary transactions in stores) to print receipts, perform their printing operations, depending on print data and command data transmitted from the host computer.

However, such various errors that a printer paper runs out and is jammed in a printing apparatus, and a cover of a printing apparatus is opened may be caused during the use of the printing apparatuses. When theses errors are caused, conventional printing apparatuses are brought to a halt, and then prevent data from continuously being transmitted from a host computer by switching off an interface connected with the host computer. Therefore, as control operations in the printing apparatus are then brought to a halt, the printing apparatus does not process the already received data and perform operations on commands from the host computer any more.

In this case, the host computer displays a dialog box that there is an error in a printing apparatus, brings a printing apparatus' operation to a halt, and then maintains the halting of the printing apparatus until a user manually solve the problem to convert a state of the corresponding printing apparatus into an on-line state.

Accordingly, when errors in the printing operation are detected in the art, users experience much inconvenience in solving the problems, and will not perform any operations until the problems are solved. In particular, since the printing operation is engaged with a cash register or a POS terminal, its errors may cause inconvenience to the store's clients.

In order to solve the foregoing problems, there has been proposed a technology of classifying commands to be processed in real time into real-time commands and processing the real-time commands in preference to common commands. More particularly, data received from a host computer are divided into two types: real-time commands and common data. Then, the common data are stored in a receive buffer, and the real-time commands are analyzed while being received.

However, when the real-time commands are processed in this manner, for example, when the real-time commands are received from a host computer to transmit state information of the printing apparatus in real time, or to control a mechanism or external apparatuses of the printing apparatus, a data receiving unit receives data from the host computer, and simultaneously analyzes the received data. Here, the processing of the data is performed on a data receive interrupt routine. When analyzing and processing of data are performed at the same time on the data receive interrupt routine as described above, if the analyzing and processing of the previously received data are not completed while the receiving, the processing of newly received real-time commands may be problematic to be performed.

More particularly, when a host computer requests state information of a printing apparatus in real time, the real-time transmission of the state information of the printing apparatus may be delayed due to the errors caused on the interface between the host computer and the printing apparatus. This transmission delay causes such problems that, in order to execute real-time commands that will be subsequently received into a receive interrupt, the execution of the next received real-time commands waits until the transmission of delayed state information is completed, or the transmission of the delayed state information should be renounced. In case the execution of the next received real-time commands waits until the transmission of the state information is completed, the performance of the printing apparatus may be deteriorated with the low data receiving rate. On the contrary, when the transmission of the delayed state information is renounced, wrong information may be transmitted.

Also, when operations of the mechanism and peripheral devices of the printing apparatus are delayed in receiving real-time control commands, which are used to control the mechanism or peripheral devices of the printing apparatus in real time, from a host computer and executing the received real-time control commands, the next received real-time commands waits until the execution of the previous real-time control commands is completed, or the execution of the previous real-time control commands should be renounced. When the next received real-time commands waits until the execution of the previous real-time control commands is completed, the performance of the printing apparatus may be deteriorated with the low data receiving rate. On the contrary, when the execution of the previous real-time control commands is renounced, undesirable operations may be performed. The operations of the mechanism and peripheral devices of the printing apparatus may be delayed when a predetermined time is required to complete the operations of the mechanism and peripheral devices, or when there are errors in the operations of the mechanism and peripheral devices.

SUMMARY OF THE INVENTION

The present invention is designed to solve the problems of the prior art, and therefore it is an object of the present invention to provide a printing apparatus and a method for processing real-time commands using the same. Here, the printing apparatus is able to be operated stably without degradation in performance of the printing apparatus due to the delays in data transmissions and operations, or the other mechanical errors, which are caused in processing the previously received commands, by storing real-time commands in separate buffers and processing the stored real-time commands in preference to common data, instead of simultaneously receiving and analyzing real-time commands received from a host computer and executing the real-time commands.

Also, it is another object of the present invention to provide a printing apparatus in which the analysis and execution of real-time commands exerts no effect on receiving data by simultaneously analyzing and executing the real-time commands separately from receiving the data in order to prevent the delay in the reception of the data caused by the problems on the interface between the host computer and the printing apparatus, and to prevent the degradation in performance of the printing apparatus, and a method for processing real-time commands using the same.

According to an aspect of the present invention, there is provided a printing apparatus that is operated by receiving data from a host computer, including a data receiver block receiving data from the host computer; a real-time command detector block detecting real-time commands from the received data, and storing the detected real-time commands in a real-time command buffer and the other data in a receive buffer; a command analysis block analyzing the real-time commands stored in the real-time command buffer in preference to the data stored in the receive buffer; and a command execution block executing the analysis results obtained by the command analysis block.

In this case, the data received from the host computer may include real-time commands, common commands and print data. Here, the real-time commands may be processed in preference to the common commands, and the real-time commands or common commands, and the real-time commands or common commands may be composed of command codes that specify the functions and operations of a printing apparatus and variables that assign details of the functions and operations.

Also, the real-time command detector block may detect real-time commands by comparing the variable number of the received real-time commands with the variable number of predetermined real-time commands corresponding to the variable number of the received real-time commands, or by comparing variables of the received real-time commands with variables of predetermined real-time commands.

Meanwhile, the real-time command analysis block may search the real time buffer in advance when real-time commands are stored in the real-time command buffer, and may analyze data stored in the receive buffer when real-time commands are absent in the real-time command buffer.

Also, the real-time command analysis block may analyze the next data without analyzing the data stored in the receive buffer when the data stored in the receive buffer includes real-time commands.

In addition, when the data received from the host computer includes real-time commands for making a request for state information on a computer, the command execution block may transmit the state information of a printing apparatus to the host computer according to the analysis results of the real-time commands for making a request for state information on the printing apparatus.

Additionally, when the data received from the host computer includes real-time commands for operating an auto cutter installed in the printing apparatus, the command execution block may cut a paper by operating the auto cutter installed in the printing apparatus according to the analysis results of the real-time commands for operating an auto cutter. When the data received from the host computer includes real-time command for controlling peripheral devices coupled to the printing apparatus, the command execution block may control the peripheral devices of the printing apparatus according to the analysis results of the real-time commands for controlling peripheral devices.

According to another aspect of the present invention, there is provided a printing apparatus that is operated by, receiving data from a host computer, including a data receiver block receiving data from the host computer; a real-time command detector block storing the received data in a receive buffer, detecting real-time commands from the received data and separately storing the detected real-time command in a real-time command buffer; a command analysis block analyzing the real-time commands stored in the real-time command buffer in preference to the data stored in the receive buffer; and a command execution block executing the analysis results obtained by the command analysis block.

According to still another aspect of the present invention, there is provided a method for processing real-time commands using the printing apparatus that is operated by receiving data from a host computer. Here, the method includes: receiving data from the host computer; detecting real-time commands from data received from the host computer; storing the detected real-time commands in a real-time command buffer and the other data in a receive buffer; analyzing the real-time commands stored in the real-time command buffer in preference to the data stored in the receive buffer; analyzing the data stored in the receive buffer when real-time commands are absent in the real-time command buffer; and executing the analysis results of the real-time commands, or the data stored in the receive buffer.

In this case, the step of analyzing the data stored in the receive buffer may include: analyzing the next data without analyzing the data stored in the receive buffer when real-time commands are detected from the data stored in the receive buffer.

Meanwhile, when the data received from the host computer include real-time commands for making a request for state information on a printing apparatus, the step of executing the analysis results may include: transmitting the state information of the printing apparatus to the host computer according to the analysis results of the real-time commands for making a request for state information on a printing apparatus. When the data received from the host computer comprises real-time commands for operating an auto cutter installed in the printing apparatus, the step of executing the analysis results may include: cutting a paper by operating the auto cutter installed in the printing apparatus according to the analysis results of the real-time commands for operating an auto cutter. When the data received from the host computer comprises real-time commands for controlling peripheral devices coupled to the printing apparatus, the step of executing the analysis results may include: controlling the peripheral devices of the printing apparatus according to the analysis results of the real-time commands for controlling peripheral devices.

According to yet another aspect of the present invention, there is provided a printing apparatus that is operated by receiving data from a host computer, including a data receiver block receiving data from the host computer; a real-time command detector block detecting real-time commands from the received data, and storing the detected real-time commands in a real-time command buffer and the received data in a receive buffer; a command analysis block analyzing the real-time commands stored in the real-time command buffer in preference to the data stored in the receive buffer; a command execution block executing the analysis results obtained by the command analysis block.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Hereinafter, exemplary embodiments of the present invention will now be described in detail with reference to the accompanying drawings. For the detailed description of the present invention, it is however considered that descriptions of known components and their related configurations according to the exemplary embodiments of the present invention may be omitted for clarity since they are judged to make the gist of the present invention unnecessarily confusing.

Figure 1:
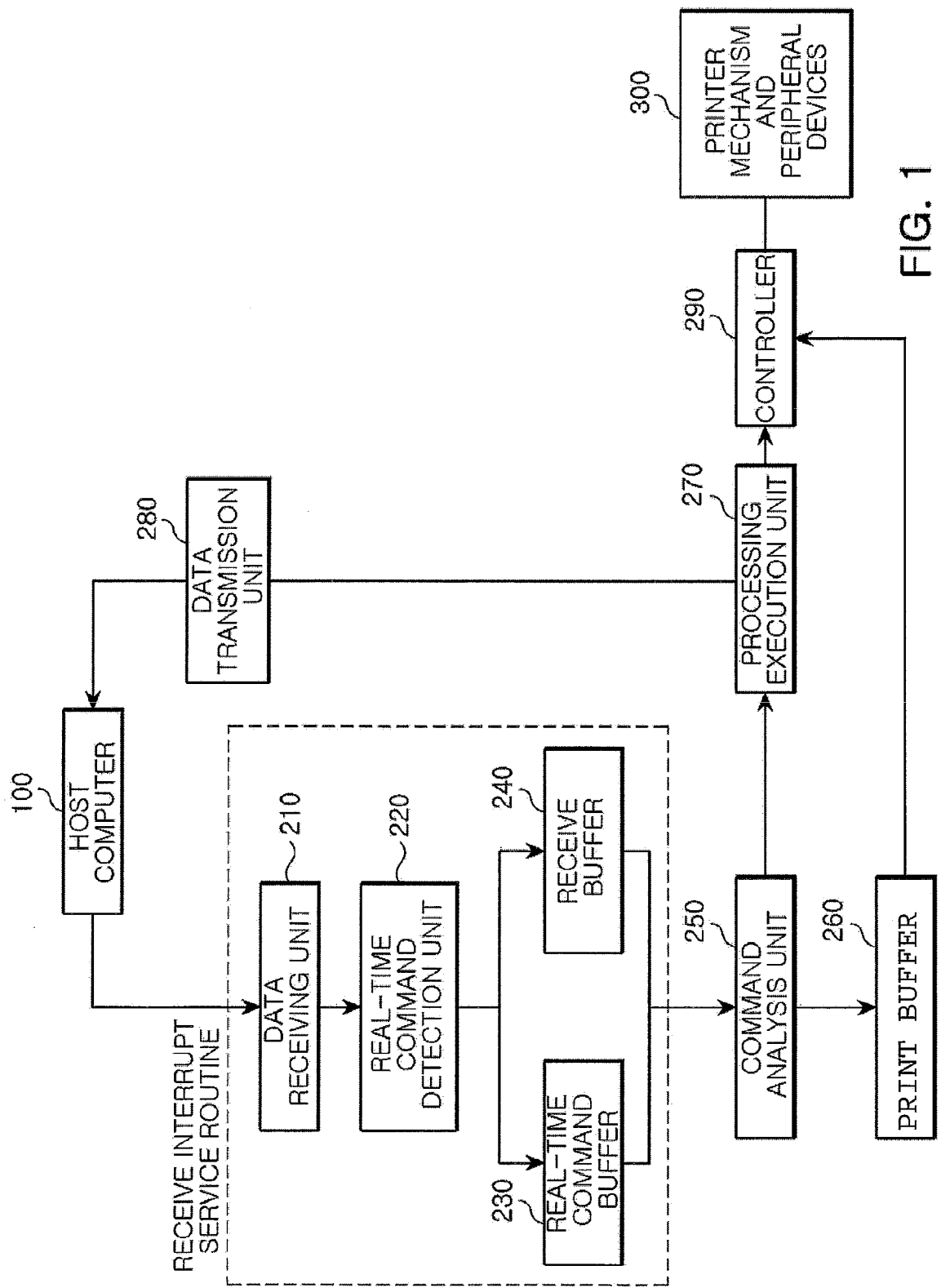
FIG. 1 is a diagram illustrating a configuration of a printing apparatus according to one exemplary embodiment of the present invention.

FIG. 1 is a diagram illustrating a configuration of a printing apparatus according to one exemplary embodiment of the present invention. Here, parts of the printing apparatus of the present invention are configured as shown in FIG. 1, and the other parts of the printing apparatus of the present invention are configured in the same manner as the conventional printing apparatuses.

As shown in FIG. 1, the printing apparatus according to one exemplary embodiment of the present invention is coupled in a wired or wireless communication manner to a host computer 100 that determines whether real-time commands are required for the printing apparatus and transmits the real-time commands as well as common data for printing. Here, the real-time commands are of highly various kinds, for example, include a command for making a request for state information on a printing apparatus in real time, a command for cutting a printer paper in real time, a command for controlling peripheral devices of the printing apparatus in real time, or the like. The expression "real-time command" used in the present invention may be understood as a relative concept of a command that is processed in preference to the other data, but is not a command that is processed temporally at the same time.

The printing apparatus that operates on the data transmitted from a host computer 100 includes a data receiving unit 210 receiving data from the host computer 100; a real-time command detection unit 220 detecting real-time commands from the received data and storing the detected real-time commands in a real-time command buffer 230; a receive buffer 240 storing the received data; a command analysis unit 250 analyzing the data stored in the real-time command buffer 230 and the receive buffer 240; a print buffer 260 storing the received data when the received data are print data; a processing execution unit 270 performing necessary operations according to the analysis results obtained by the command analysis unit; a data transmission unit 280 transmitting data to a host computer; and a controller 290 controlling the mechanism and peripheral devices 300 of the printing apparatus according to the analysis results obtained by the command analysis unit. Hereinafter, the above-listed components of the printing apparatus are described in more detail.

The data receiving unit 210 receives data from the host computer 100. Here, the data received from the host computer 100 includes print data for printing, a common command for making a request for certain operations to the printing apparatus; and a real-time command for processing data in real time. Therefore, the data receiving unit 210 receives the print data, the common command and the real-time command from the host computer 100.

The real-time command detection unit 220 determines whether real-time commands are present among the data received through the data receiving unit 210, and stores the real-time commands in the real-time command buffer 230 when the real-time commands are detected from the received data. Also, the real-time command detection unit 220 stores in the receive buffer 240 the data except for the real-time commands among the data received through the data receiving unit 210. However, the real-time command detection unit 220 may store the real-time commands in the receive buffer 240, when necessary.

Instead of simultaneously receiving and analyzing the data and processing a real-time command, the real-time command detection unit 220 is used to detect the real-time command, and to store the detected real-time command in the real-time command buffer 230. That is, the printing apparatus may receive data in spite of a variety of the problems, which are caused in analyzing and processing the real-time command, by employing the real-time command detection unit 220 and the real-time command buffer 230 to receive, analyze and process the real-time command separately, which makes it possible to prevent the degradation in performance of the printing apparatus.

The real-time command detection unit 220 for detecting a real-time command may be applicable to a wide extent. For example, the two following methods are applicable herein.

First, there is a method of detecting a real-time command using a length of the real-time command and an amount of received data. More particularly, the real-time command detection unit 220 receives data from the data receiving unit 210, compares the received data with a variable length N of the corresponding real-time command when a real-time command start flag is set by receiving a real-time command code, resets the real-time command start flag when the received data have the same length as the corresponding real-time command, transfers a context stored in a transitory real-time buffer (not shown) to a real-time command buffer and store the transferred context, and erases the context of the transitory real-time buffer. When the variable is shorter than the variable length N of the corresponding real-time command, the real-time command detection unit 220 erases the data stored in the transitory real-time buffer and does not store the variable in the real time buffer. As a result, only the real-time command is stored in the real-time command buffer.

When a real-time command start flag is not set but a common command start flag is set by reception of a common command code, the real-time command detection unit 220 stores the received common command in the receive buffer 240 until the received common command has the same variable length as a variable length n of the corresponding common command. Then, the common command start flag is reset when the received common command has the same variable length as a variable length n of the corresponding common command. In this case, the real time command included in the common commands is stored in the receive buffer 240. The real-time command start flag or the common command start flag is set according to the subsequently received command codes.

Next, there is a method for detecting a real-time command by comparing data or parameters comprising real-time commands. The real-time command detection unit 220 detects the start and end of commands by comparing the received data with a command code and variable of a predetermined real-time command, detects one command and stores the one command in the real-time command buffer 230, and stores the other data in the receive buffer 240. In this case, the real time command included in the common commands is not stored in the real-time command buffer, but may be stored in the receive buffer 240.

Receiving data transmitted from the host computer 100 and storing the received data in the real-time command buffer 230 and the receive buffer 240 at the real-time command detection unit 220 are performed on a receive interrupt service routine, and analyzing and processing a real-time command is performed regardless of the reception of data, by using the data stored in the real-time command buffer 230 and the receive buffer 240.

More particularly, the command analysis unit 250 analyzes real-time commands stored in the real-time command buffer 230 and common commands or print data stored in the received buffer 240, stores the print data in the print buffer 260 and transmits the analysis results of the real-time commands and common commands to a processing execution unit.

First, the command analysis unit 250 searches the real-time command buffer 230, preferentially analyzes a real-time command, regardless of the data stored in the receive buffer 240, when the real-time command is present in the real-time command buffer 230, and then transmits the analysis results to the processing execution unit 270. However, when a plurality of real-time commands is present in the real-time command buffer 230, the command analysis unit 250 analyzes the real-time commands according to a First-In-First-Out (FIFO) principle.

When no real-time command is present in the real-time command buffer 230, the command analysis unit 250 searches the received buffer 240, and analyzes the stored common commands or print data according to a First-In-First-Out (FIFO) principle. Then, the command analysis unit 250 stores the print data in the print buffer 260 and transmits the analysis results of the common commands to the processing execution unit 270.

First, the command analysis unit 250 searches the real-time command buffer 230. Then, when a real-time command is not present in the real-time command buffer 230, the command analysis unit 250 searches, analyzes and executes the common commands or print data stored in the receive buffer 240, and then searches the real-time command buffer 230 once more. These procedures may be repeated to continuously check the presence of a real-time command and process the real-time command in preference to the other common commands or print data.

The command analysis unit 250 also functions to check real-time commands stored in the receive buffer 240 or real-time commands present in the common commands and prevent the execution of the real-time commands present in the common commands. Only the real-time commands are stored in the real-time command buffer 230, but the real-time commands, common commands and print data may be stored in the receive buffer 240, when necessary. In this case, unnecessary responses may be induced when executing the real-time commands stored in the receive buffer 240. Therefore, the command analysis unit 250 determines whether the data stored in the receive buffer 240 comprise a real-time command when it is required to analyze the stored data, and does not analyze the stored data but reads the next data when the stored data comprise a real-time command, repeating the above procedures. When the stored data do not comprise a real-time command, the command analysis unit 250 continues to perform analysis procedures.

The processing execution unit 270 functions to execute the analysis results obtained by the command analysis unit 250. That is, when the real-time commands and common commands are analyzed by the command analysis unit 250, the analysis results are transmitted and processed in the processing execution unit 270. Hereinafter, an operation of the processing execution unit 270 is described in more detail by using specific examples of the real-time command.

For example, when a real-time command transmitted from the host computer 100 is associated with the transmission of state information on the printing apparatus, the processing execution unit 270 may transmit the state information on the printing apparatus to the host computer 100 via the data transmission unit 280 by using state memory (not shown) of the printing apparatus. When there are errors on the printing apparatus, the host computer waits without further transmission of data until the errors on the printing apparatus are solved, which renders it possible to prevent unauthorized printings caused by the errors on the printing apparatus. Also, a user may prepare for a counter plan by checking a state of the printing apparatus from the host computer 100.

Also, when the real-time command transmitted from the host computer 100 is a command for cutting an unnecessary portion of a printer paper in real time with an auto cutter installed in the printing apparatus, the processing execution unit 270 may cut a printer paper by controlling an auto cutter through the controller 290 according to the analysis results of the real-time command for operation of the auto cutter from the command analysis unit 250.

In addition, when the real-time command transmitted from the host computer 100 is a command for controlling operations of peripheral devices coupled to the printing apparatus, particularly when a command for operating a cash drawer coupled to the printing apparatus in real time is transmitted from the host computer 100, the processing execution unit 270 controls an operation of the cash drawer by means of the controller 290 according to the analysis results from the command analysis unit 250. In this procedure, it is possible to improve the users' convenience by allowing a cash drawer to operate during a printing procedure, when necessary, and to provide more effective services by operating a cash drawer during the printing operation.

Additionally, the data transmission unit 280 functions to transmit data when it is necessary to transmit the data to the host computer 100, and the printer mechanism and peripheral devices 300 functions to perform a necessary operation according to the control of the controller 290.

Figure 2:
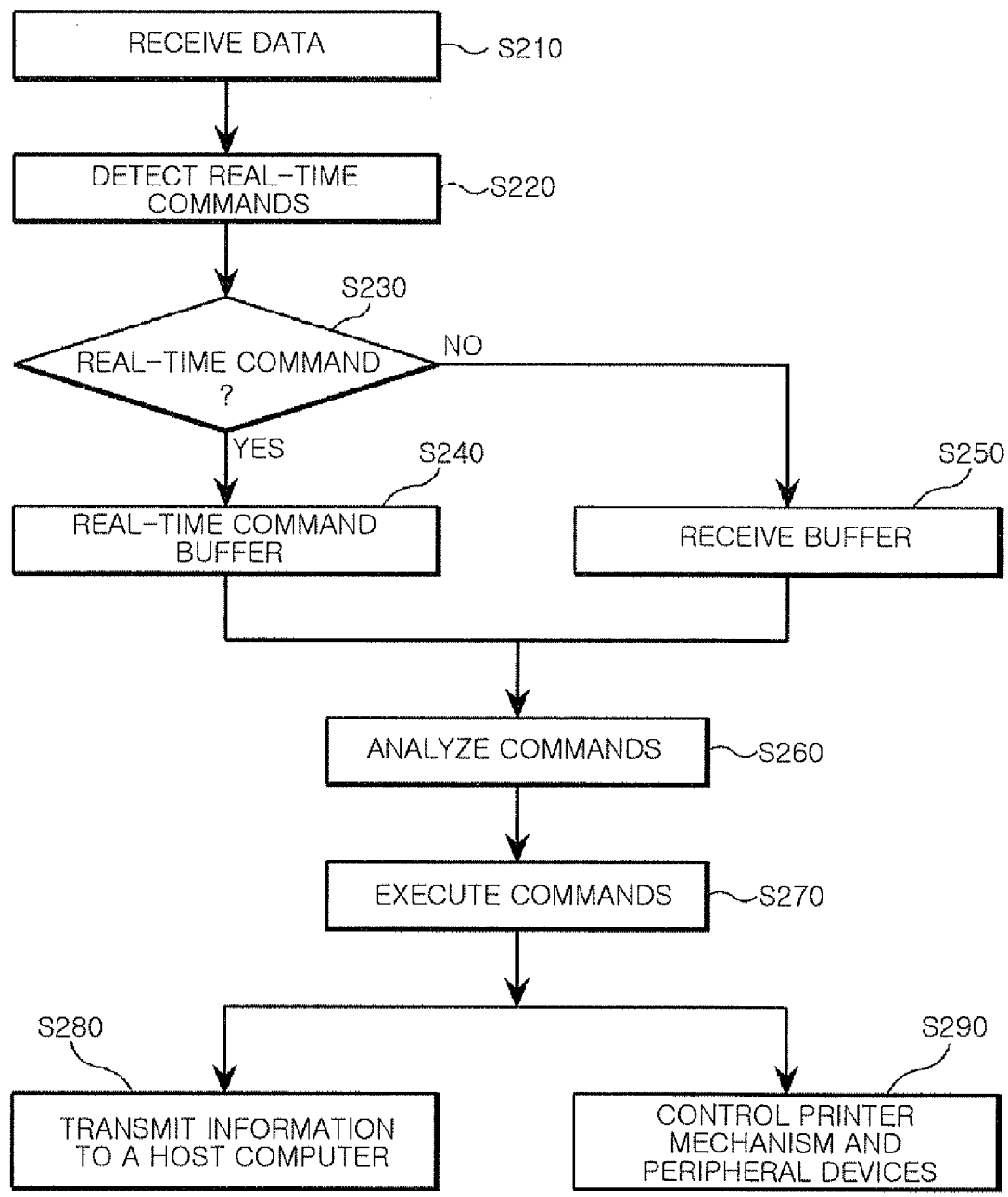
FIG. 2 is a flowchart illustrating a method for processing real-time commands using the printing apparatus according to one exemplary embodiment of the present invention.

FIG. 2 is a flowchart illustrating a method for processing a real-time command using the printing apparatus according to one exemplary embodiment of the present invention.

More particularly, the method for processing a real-time command using the printing apparatus includes: receiving data from a host computer (S210), detecting the data received from the host computer (S220 and S230), storing a real-time command in a real-time command buffer (S240), storing the other data in a receive buffer (S250), analyzing the real-time command stored in the real-time command buffer in preference to the data stored in the receive buffer and analyzing the data stored in the receive buffer when a real-time command is not present in the real-time command buffer (S260), and executing the analysis results of the real-time command or the data stored in the receive buffer (S270, S280 and S290).

The step of receiving data (S210) is to receive data transmitted from the host computer 100 via the data receiving unit 210. The data transmitted from the host computer 100 include real-time commands, common commands, print data, and the like.

The step of detecting a real-time command (S220) is to detect a real-time command from the received data. As a result of detecting the received data (S230), the real-time command is stored in the real-time command buffer (S240), and the other data are stored in the receive buffer (S250). The real time command buffer 230 and the receive buffer 240 are provided separately to analyze and execute commands. Here, when the real-time command is present in the real-time command buffer 230, the command analysis unit 250 always searches the real-time command buffer 230 in advance, and preferentially analyzes and executes a real-time command. Meanwhile, when the real-time command is absent in the real-time command buffer 230, the command analysis unit 250 searches the receive buffer 240, and processes the data stored in the receive buffer 240. In these procedures, the receiving of data from a host computer may be performed separately while the real-time command is being analyzed and executed in preference to the other common commands or print data, even when the transmission of the data is delayed during the procedure of executing commands. Therefore, this renders it possible to prevent the degradation in performance of the printing apparatus.

The step of analyzing the real-time command (S260) includes: searching the real-time command buffer 230 in advance as described above, and analyzing a real-time command in preference to the other data stored in the receive buffer 240 when the real-time command is present in the real-time command buffer 230. In addition to preferentially searching the real-time command buffer 230, the step of analyzing the real-time command (S260) includes: detecting the real-time command present in the receive buffer 240 and preventing the real-time command from being analyzed and executed.

The step of executing the real-time command (S270) includes: executing a real-time command according to the analysis results obtained in the step of analyzing the real-time command (S260). When the real-time command is associated with transmission of state information to the host computer, the step of transmitting information to a host computer is performed. On the while, when the real-time command is associated with control of mechanism or peripheral devices of the printing apparatus, the step of controlling mechanism or peripheral devices of the printing apparatus is performed according to the analysis results of the real-time command.

Figure 3:
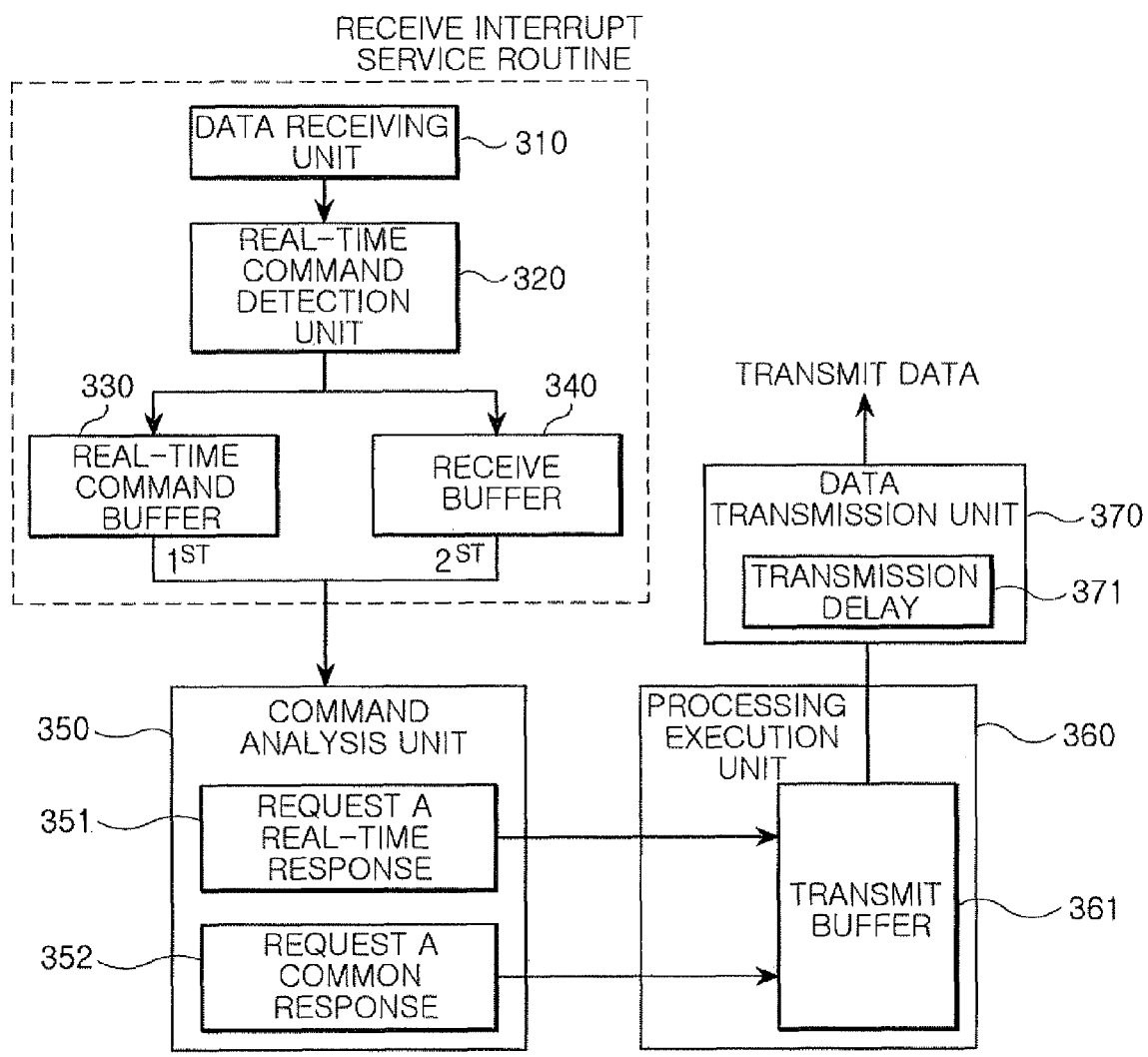
FIG. 3 is a diagram illustrating an operation of a printing apparatus when a real-time command for making a request for state information is received from a host computer. computer.

FIG. 3 is a diagram illustrating an operation of a printing apparatus when a real-time command for making a request for state information is received from a host computer.

When a real-time command is received from a host computer, the conventional printing apparatus analyzes the real-time command while receiving the real-time command. However, when the real-time command is associated with transmission of real-time information to a host computer, the transmission of real-time information may be delayed due to the problems on the interface with the host computer. In this case, when a new real-time command is received, an execution system to execute the new real-time command abandons the pre-existing response data to be transmitted to a host computer and transmits a new information data to the host computer, or waits until the transmission of the pre-existing information data is completed. As a result, when the pre-existing response data are abandoned, wrong information may be transmitted to the host computer, while the data receiving rate may be low when the execution system waits until the transmission of the pre-existing information data is completed, which leads to degraded performance of the printing apparatus. However, the above-mentioned problems may be overcome by the technical configuration of the present invention as shown in FIG. 3.

More particularly, among the data received through the data receiving unit 310, the real-time command is stored in the real-time command buffer 330 by the real-time command detection unit 320, and the other data are stored in the receive buffer 340. That is, unlike the conventional methods, even when the real-time command is received, the real-time command is not analyzed and executed while being received, but is stored in the real-time command buffer 330 in advance. This storage method may prevent problems, which are caused in the procedure of analyzing and executing a real-time command, from affecting the reception of data.

The command analysis unit 350 analyzes the real-time command stored in the real-time command buffer 330 in preference to the other data stored in the receive buffer 340. That is, the command analysis unit 350 analyzes a real-time command for transmitting state information of the printing apparatus to the host computer in real time, and transmits the analysis results of the real-time command to the processing execution unit 360. The processing execution unit 360 reads the state information of the printing apparatus, stores the state information in a transmit buffer 361, and transmits the stored state information to the host computer via the data transmission unit 370. However, the transmission delay of the state information may be caused during the transmission of data due to the problems on the interface between the host computer and the printing apparatus. When real-time commands are continuously received during the delay in the transmission of data, the newly received real-time commands are sequentially stored in the real-time command buffer 330. As a result, the delay in the transmission of data does not have an effect on receiving the data, which makes it possible to prevent the degradation in performance of the printing apparatus.

Figure 4:
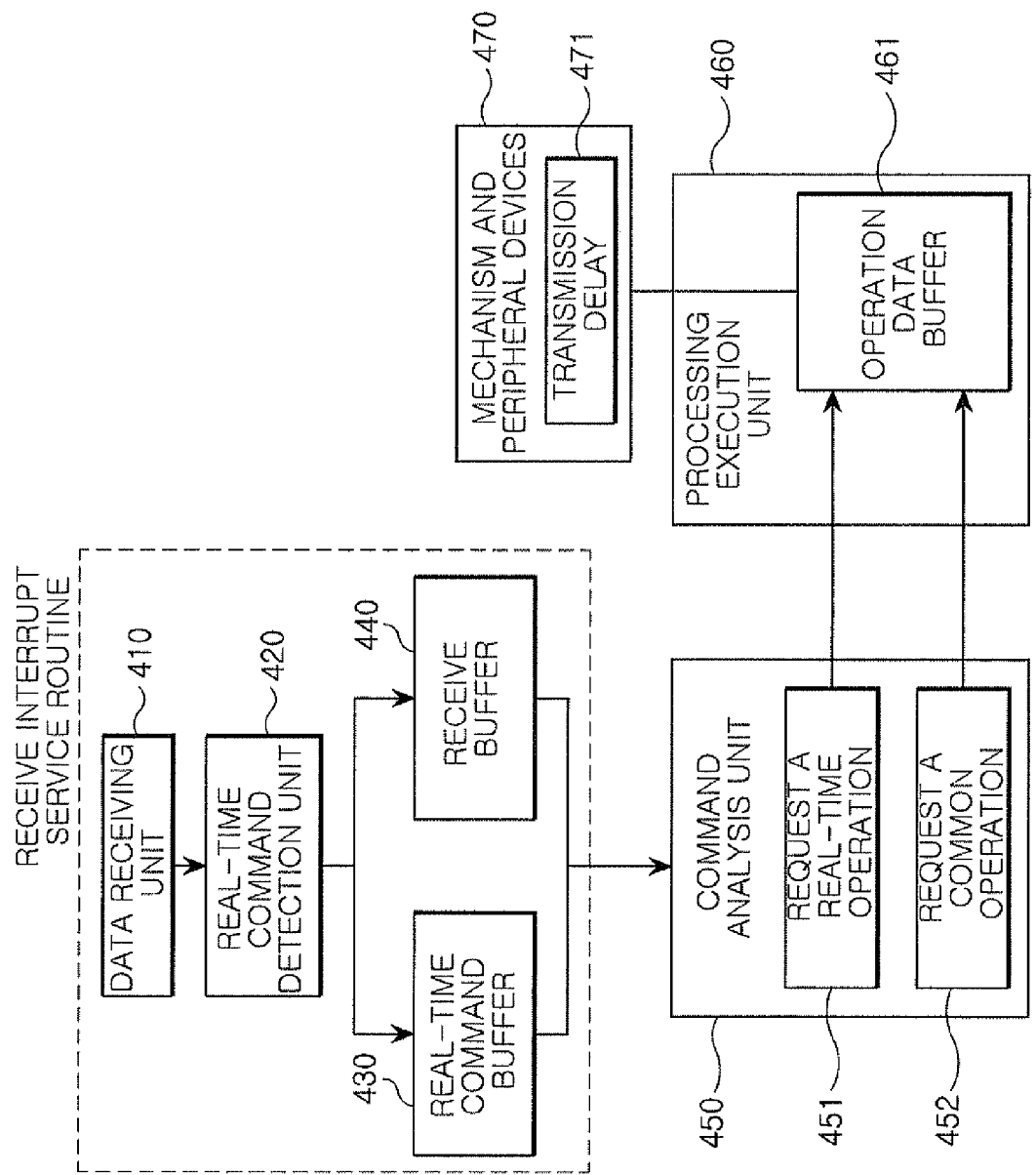
FIG. 4 is a diagram illustrating an operation of a printing apparatus when real-time commands for making a request for mechanism of the printing apparatus or operation of peripheral devices are received from a host computer.

FIG. 4 is a diagram illustrating an operation of a printing apparatus when a real-time command for making a request for mechanism of the printing apparatus or operations of peripheral devices is received from a host computer.

When a real-time command is received from a host computer in the conventional printing apparatus, the real-time command is analyzed while being received. In this case, when the real-time command is a command for making a request for operations of mechanism or peripheral devices of the printing apparatus as shown in FIG. 4, and the operations of the mechanism or peripheral devices of the printing apparatus are delayed, the previous operations of the mechanism or peripheral devices are suspended, or the execution of the next real-time command waits until the previous operations are completed. In this case, the performance of the printing apparatus may be deteriorated, and the printing apparatus may not work properly as well.

However, all the received data are separately stored in a real-time command buffer for storing only a real-time command, and in a receive buffer for storing the other data, as shown in FIG. 4. Then, when the operations in the mechanism and peripheral devices 470 are delayed, a new real-time command may be received via the data receiving unit 410 and stored in the real-time command buffer 430, regardless of the delay in the operations of the mechanism and peripheral devices 470, which renders it possible to prevent the degradation in performance of the printing apparatus or the wrong operation of the printing apparatus.

As described above, the printing apparatus according to one exemplary embodiment of the present invention and the method for processing real-time commands using the same may be useful to prevent the degradation in performance of the printing apparatus, which is caused in simultaneously receiving and analyzing real-time commands received from the host computer and executing the real-time commands, by separately storing the real-time commands transmitted from the host computer and then processing the stored real-time commands in preference to the other common data.

Also, the printing apparatus according to one exemplary embodiment of the present invention and the method for processing real-time commands using the same may be useful to perform a precise printing operation since the data may be received from a host computer regardless of the delays in data transmissions and operations of mechanism and peripheral devices of the printing apparatus when transmitting state information to the host computer.

The present invention has been described in detail. However, it should be understood that the detailed description and specific examples, while indicating preferred embodiments of the invention, are given by way of illustration only, since various changes and modifications within the scope of the invention will become apparent to those skilled in the art from this detailed description.

What is claimed is:

1. A printing apparatus that is operated by receiving data from a host computer, comprising:
   a data receiver block receiving data from the host computer;
   a real-time command detector block detecting real-time commands from the received data, and storing the detected real-time commands in a real-time command buffer and the other data in a receive buffer;
   a command analysis block analyzing the real-time commands stored in the real-time command buffer in preference to the data stored in the receive buffer; and
   a command execution block executing the analysis results obtained by the command analysis block.

2. The printing apparatus of claim 1, wherein the data received from the host computer comprises real-time commands, common commands and print data.

3. The printing apparatus of claim 2, wherein the real-time commands or common commands are composed of command codes that specify the functions and operations of a printing apparatus and variables that assign details of the functions and operations.

4. The printing apparatus of claim 1, wherein the real-time command detector block detects real-time commands by comparing the variable number of the received real-time commands with the variable number of predetermined real-time commands corresponding to the variable number of the received real-time commands.

5. The printing apparatus of claim 1, wherein the real-time command detector block detects real-time commands by comparing variables of the received real-time commands with variables of predetermined real-time commands corresponding to the variables of the received real-time commands.

6. The printing apparatus of claim 1, wherein the real-time command analysis block searches the real time buffer in advance when real-time commands are stored in the real-time command buffer, and analyzes data stored in the receive buffer when real-time commands are absent in the real-time command buffer.

7. The printing apparatus of claim 1, wherein the real-time command analysis block analyzes the next data without analyzing the data stored in the receive buffer when the data stored in the receive buffer comprises real-time commands.

8. The printing apparatus of claim 1, wherein the data received from the host computer comprises real-time commands for making a request for state information on a printing apparatus.

9. The printing apparatus of claim 8, wherein the command execution block transmits the state information of the printing apparatus to the host computer according to the analysis results of the real-time commands for making a request for state information on a printing apparatus.

10. The printing apparatus of claim 1, wherein the data received from the host computer comprises real-time commands for operating an auto cutter installed in the printing apparatus.

11. The printing apparatus of claim 10, wherein the command execution block cuts a paper by operating the auto cutter installed in the printing apparatus according to the analysis results of the real-time commands for operating an auto cutter.

12. The printing apparatus of claim 1, wherein the data received from the host computer comprises real-time commands for controlling peripheral devices coupled to the printing apparatus.

13. The printing apparatus of claim 12, wherein the command execution block controls the peripheral devices of the printing apparatus according to the analysis results of the real-time commands for controlling peripheral devices.

14. A printing apparatus that is operated by receiving data from a host computer, comprising:
   a data receiver block receiving data from the host computer;
   a real-time command detector block detecting real-time commands from the received data, and storing the detected real-time commands in a real-time command buffer and the received data in a receive buffer;
   a command analysis block analyzing the real-time commands stored in the real-time command buffer in preference to the data stored in the receive buffer; and
   a command execution block executing the analysis results obtained by the command analysis block.

15. The printing apparatus of claim 14, wherein the real-time command analysis block analyzes the next data without analyzing the data stored in the receive buffer when the data stored in the receive buffer comprises real-time commands.

16. A method for processing real-time commands using the printing apparatus that is operated by receiving data from a host computer, the method comprising:
   detecting real-time commands from data received from the host computer;
   storing the detected real-time commands in a real-time command buffer and the other data in a receive buffer;
   analyzing the real-time commands stored in the real-time command buffer in preference to the data stored in the receive buffer; and
   executing the analysis results of the real-time commands.

17. The method of claim 16, further comprising:
   analyzing the data stored in the receive buffer when real-time commands are absent in the real-time command buffer; and executing the analysis results of the data stored in the receive buffer.

18. The method of claim 17, wherein the step of analyzing the data stored in the receive buffer comprises:
  analyzing the next data without analyzing the data stored in the receive buffer when real-time commands are detected from the data stored in the receive buffer.

19. The method of claim 16, wherein the step of executing the analysis results comprises, when the data received from the host computer comprises real-time commands for making a request for state information on a printing apparatus:
  transmitting the state information of the printing apparatus to the host computer according to the analysis results of the real-time commands for making a request for state information on a printing apparatus.

20. The method of claim 16, wherein the step of executing the analysis results comprises, when the data received from the host computer comprises real-time commands for operating an auto cutter installed in the printing apparatus:
  cutting a paper by operating the auto cutter installed in the printing apparatus according to the analysis results of the real-time commands for operating an auto cutter.

21. The method of claim 16, wherein the step of executing the analysis results comprises, when the data received from the host computer comprises real-time commands for controlling peripheral devices coupled to the printing apparatus:
  controlling the peripheral devices of the printing apparatus according to the analysis results of the real-time commands for controlling peripheral devices.

22. A printing apparatus that is operated by receiving data from a host computer, comprising:
  a data receiver block receiving data from the host computer;
  a real-time command detector block storing the received data in a receive buffer, detecting real-time commands from the received data and separately storing the detected real-time command in a real-time command buffer;
  a command analysis block analyzing the real-time commands stored in the real-time command buffer in preference to the data stored in the receive buffer; and
  a command execution block executing the analysis results obtained by the command analysis block.

\* \* \* \* \*